United States Patent
Tanji et al.

(10) Patent No.: US 11,458,910 B2
(45) Date of Patent: Oct. 4, 2022

(54) WIRE HARNESS UNIT

(71) Applicants: SUMITOMO WIRING SYSTEMS, LTD., Mie-ken (JP); TOYOTA JIDOSHA KABUSHIKI KAISHA, Aichi-ken (JP)

(72) Inventors: Seiya Tanji, Yokkaichi (JP); Yuji Tanaka, Yokkaichi (JP); Hiroki Yuasa, Toyota (JP); Isamu Takahashi, Toyota (JP)

(73) Assignees: SUMITOMO WIRING SYSTEMS, LTD., Yokkaichi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/386,544

(22) Filed: Jul. 28, 2021

(65) Prior Publication Data

US 2022/0041122 A1    Feb. 10, 2022

(30) Foreign Application Priority Data

Aug. 7, 2020   (JP) .............................. JP2020-135292

(51) Int. Cl.
    *H02G 3/32* (2006.01)
    *B60R 16/02* (2006.01)

(52) U.S. Cl.
    CPC ........... *B60R 16/0215* (2013.01); *H02G 3/32* (2013.01)

(58) Field of Classification Search
    CPC ............................. H02G 3/32; B60R 16/0215
    USPC ......................................................... 174/72 A
    See application file for complete search history.

(56) References Cited

U.S. PATENT DOCUMENTS

| | | | |
|---|---|---|---|
| 6,206,331 B1* | 3/2001 | Keith .................. | B60R 16/0215 248/74.1 |
| 2004/0026577 A1* | 2/2004 | Yasuda ................. | F16L 3/1025 248/74.3 |
| 2014/0166825 A1* | 6/2014 | Shiga ........................ | F16L 3/12 248/74.2 |
| 2017/0267191 A1* | 9/2017 | Chambosse ............... | F16B 2/08 |

FOREIGN PATENT DOCUMENTS

| | | |
|---|---|---|
| JP | H11-210934 A | 8/1999 |
| JP | 2012-222888 A | 11/2012 |

\* cited by examiner

*Primary Examiner* — Timothy J Thompson
*Assistant Examiner* — Michael F McAllister

(57) ABSTRACT

A wire harness unit includes a first electrical cable, a first tubular member that covers the first electrical cable, a rubber member that is attached to an outer circumferential surface of the first tubular member, a bracket that includes a first fixing portion supporting the first tubular member with the rubber member in between, and a fastening member that surrounds and fastens the rubber member and the first fixing portion. The first tubular member is made of a metal that contains a first metal as a major component. The bracket is made of a metal that contains a second metal, which is different from the first metal, as a major component.

7 Claims, 4 Drawing Sheets

WIRE HARNESS UNIT

BACKGROUND

1. Field

The present disclosure relates to a wire harness unit.

2. Description of Related Art

Examples of known structures for fixing harnesses to vehicles include a band-shaped clip wrapped around the outer circumference of a harness. The opposite ends of the clip are stacked together and fastened to a bracket by a bolt (for example, refer to Japanese Laid-Open Patent Publication No. 11-210934).

In some cases, a harness as described above includes an electrical cable and a tubular metal pipe covering the electrical cable. In this case, if the metal pipe and the clip are made of different metals, direct contact between the metal pipe and the clip is likely to cause galvanic corrosion.

SUMMARY

Accordingly, it is an objective of the present disclosure to provide a wire harness unit that suppresses the occurrence of corrosion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wire harness unit includes a first electrical cable, a first tubular member that covers the first electrical cable, a rubber member that is attached to an outer circumferential surface of the first tubular member, a bracket, and a fastening member. The bracket includes a first fixing portion. The first fixing portion supports the first tubular member with the rubber member in between. The fastening member surrounds and fastens the rubber member and the first fixing portion. The first tubular member is made of a metal that contains a first metal as a major component. The bracket is made of a metal that contains a second metal, which is different from the first metal, as a major component.

The wire harness unit of the present disclosure suppresses the occurrence of corrosion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
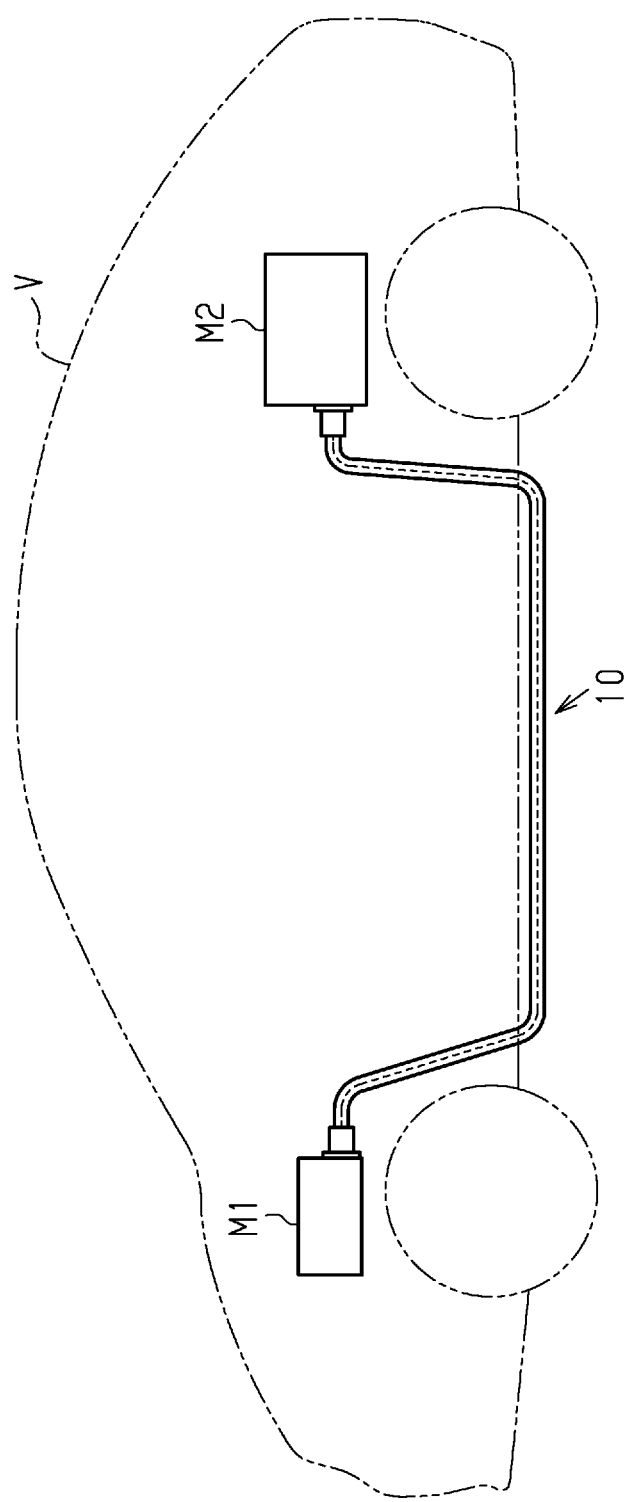
FIG. 1 is a schematic diagram illustrating a vehicle on which a wire harness unit, according to an embodiment, is routed.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

[Description of Embodiments of Present Disclosure]

First, manners in which the present disclosure is embodied will be listed and described.

[1] A wire harness unit of the present disclosure includes a first electrical cable, a first tubular member that covers the first electrical cable, a rubber member that is attached to an outer circumferential surface of the first tubular member, a bracket, and a fastening member. The bracket includes a first fixing portion. The first fixing portion supports the first tubular member with the rubber member in between. The fastening member surrounds and fastens the rubber member and the first fixing portion. The first tubular member is made of a metal that contains a first metal as a major component. The bracket is made of a metal that contains a second metal, which is different from the first metal, as a major component.

With this configuration, the first tubular member is made of metal that contains the first metal as the major component, and the bracket is made of metal that contains the second metal, which is different from the first metal, as the major component. Thus, if the first tubular member and the bracket were configured to contact directly with each other, corrosion would easily occur. However, since the rubber member prevents direct contact between the first tubular member and the bracket, corrosion is unlikely to occur.

[2] The first fixing portion preferably includes an engagement portion located at a part, in a longitudinal direction, of the first tubular member, the engagement portion being engageable with the fastening member.

With this configuration, the first fixing portion includes the engagement portion, which is engageable with the fastening member, in a section in the longitudinal direction of the first tubular member. This prevents the fastening member from being displaced in relation to the first fixing portion.

[3] The first fixing portion preferably includes a first section, a second section that extends in a bent state from the first section, and a through-hole that extends across the first section and the second section. The engagement portion preferably includes an inner wall surface of the through-hole.

With this configuration, the first fixing portion includes the first section, the second section, which extends in a bent state from the first section, and the through-hole, which extends across the first section and the second section. The engagement portion includes the inner wall surface of the through-hole. The fastening member is engaged with the inner wall surface of the through-hole so as to be prevented from being displaced in relation to the first fixing portion.

[4] The first fixing portion preferably includes a first section and a second section that extends in a bent state from the first section. The first section preferably includes a first recess that is provided at an end on a side opposite to the second section. The engagement portion preferably includes an inner wall surface of the first recess.

With this configuration, the first fixing portion includes the first section and the second section, which extends in a bent state from the first section. The first section includes the first recess, which is located at the end opposite to the second section. The engagement portion includes the inner wall surface of the first recess. Accordingly, the fastening member is engaged with the inner wall surface of the first recess so as to be prevented from being displaced in relation to the first fixing portion.

[5] The second section preferably includes a second recess that is provided at an end on a side opposite to the first section. The engagement portion preferably includes an inner wall surface of the second recess.

With this configuration, the second section includes the second recess, which is located at the end opposite to the first section. The engagement portion includes the inner wall surface of the second recess. Accordingly, the fastening member is engaged with the inner wall surface of the second recess so as to be prevented from being displaced in relation to the first fixing portion.

[6] The wire harness unit preferably further includes a second electrical cable and a second tubular member that covers the second electrical cable. The bracket preferably includes a second fixing portion that supports the second tubular member, and a coupling portion that couples the first fixing portion and the second fixing portion to each other.

With this configuration, the bracket includes the second fixing portion, which supports the second tubular member, and the coupling portion, which couples the first fixing portion and the second fixing portion to each other. This allows the single bracket to support the first tubular member and the second tubular member. Thus, the first tubular member and the second tubular member can be collectively fixed to the vehicle using the bracket.

[7] The connecting portion preferably includes a bent portion.

With this configuration, since the coupling portion includes the bent portion, the first tubular member and the second tubular member can be fixed, for example, in an arrangement space having a complicated shape.

[Description of Embodiments of Present Disclosure]

A specific example of a wire harness unit according to the present disclosure will now be described with reference to the drawings. For the illustrative purposes, some parts of the structures in the drawings may be exaggerated or simplified. The dimensional ratios of portions may be different among the drawings. The terms "parallel" and "orthogonal" are not necessarily used in a strict sense, but may be used in cases where elements are generally parallel with each other or orthogonal to each other within ranges in which such configuration achieves the operational advantages of the embodiment.

Schematic Configuration of Wire Harness Unit 10

A wire harness unit 10 shown in FIG. 1 electrically connects two vehicle on-board devices mounted on a vehicle V to each other. The vehicle V is, for example, a hybrid vehicle or an electric vehicle. The wire harness unit 10 electrically connects a vehicle on-board device M1 and a vehicle on-board device M2 to each other. The wire harness unit 10 is routed from the vehicle on-board device M1 to the vehicle on-board device M2 such that part of the wire harness 10 in the longitudinal direction extends underneath the floor panel of the vehicle V. Examples of the vehicle on-board device M1 include an inverter located in a front part of the vehicle V, and examples of the vehicle on-board device M2 include a high-voltage battery located in a rear part of the vehicle V. The inverter included in the vehicle on-board device M1 is connected to a wheel-driving motor (not shown), which is a power source for driving the vehicle V. The inverter generates alternate-current power from direct-current power from the high-voltage battery and supplies the alternate-current power to the motor. The high-voltage battery included in the vehicle on-board device M2 is a battery that is capable of supplying a voltage greater than or equal to one hundred volts.

Detailed Configuration of Wire Harness Unit 10

Figure 2:
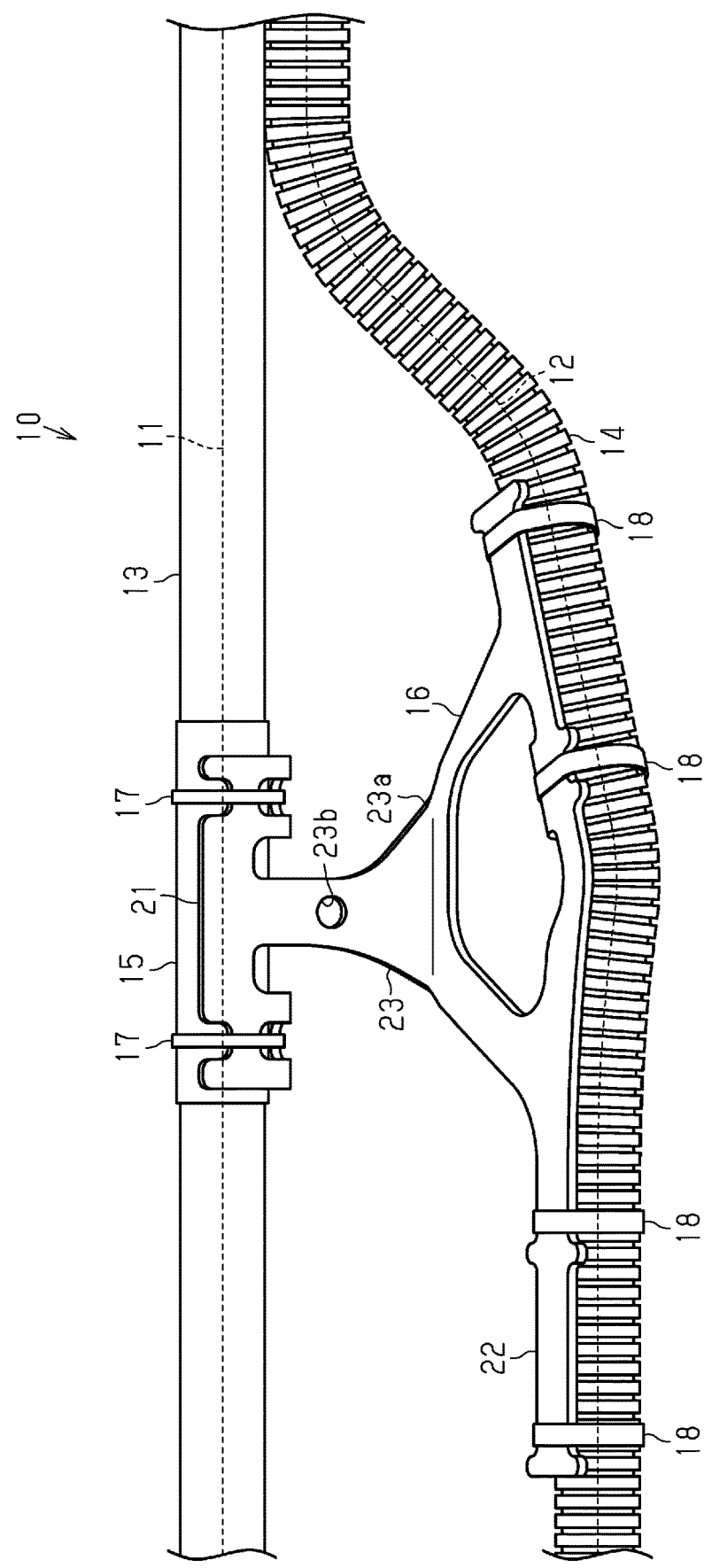
FIG. 2 is a perspective view partially illustrating the wire harness unit of the embodiment.

As shown in FIG. 2, the wire harness unit 10 includes a first electrical cable 11, a second electrical cable 12, a metal pipe 13 as a first tubular member, a corrugated tube 14 as a second tubular member, a rubber member 15, a bracket 16, fastening bands 17 as fastening members, and adhesive tapes 18.

The first electrical cable 11, for example, includes a high-voltage electrical wire and a low-voltage electrical wire. The second electrical cable 12 is designed to carry a current of a system different that of the first electrical cable 11, and includes a high-voltage electrical wire and a low-voltage electrical wire.

The metal pipe 13 is made of a metal that contains aluminum, which is a first metal, as the major component. The metal of the metal pipe 13 is selected based on, for example, the stiffness, the weight, and the cost. The metal pipe 13 is provided to cover the first electrical cable 11. In other words, the first electrical cable 11 is provided to extend through the interior of the metal pipe 13.

The corrugated tube 14 is made of plastic. The corrugated tube 14 has a tubular shape of which the opposite ends in the longitudinal direction are open. The corrugated tube 14 has a bellows-like structure in which a large diameter and a small diameter are arranged alternately in the longitudinal direction. The corrugated tube 14 is easier to bend than the metal pipe 13 and the like. The corrugated tube 14 is provided to cover the second electrical cable 12. In other words, the second electrical cable 12 is provided to extend through the interior of the corrugated tube 14.

The rubber member 15 is made of ethylene propylene diene (EPDM) rubber. The rubber member 15 is molded into a sheet. The rubber member 15 is attached to the outer circumferential surface of the metal pipe 13. Specifically, the rubber member 15 is wrapped around the outer circumferential surface of a section in the longitudinal direction of the metal pipe 13.

The bracket 16 is made of a metal that contains a second metal, which is different from the first metal, as the major component. The second metal is iron in the present embodiment. The metal of the bracket 16 is selected based on, for example, the stiffness, the weight, and the cost. The bracket 16 is formed by bending a metal plate. The bracket 16 includes a first fixing portion 21, a second fixing portion 22, and a coupling portion 23, which couples the first fixing portion 21 and the second fixing portion 22 to each other.

Figure 3:
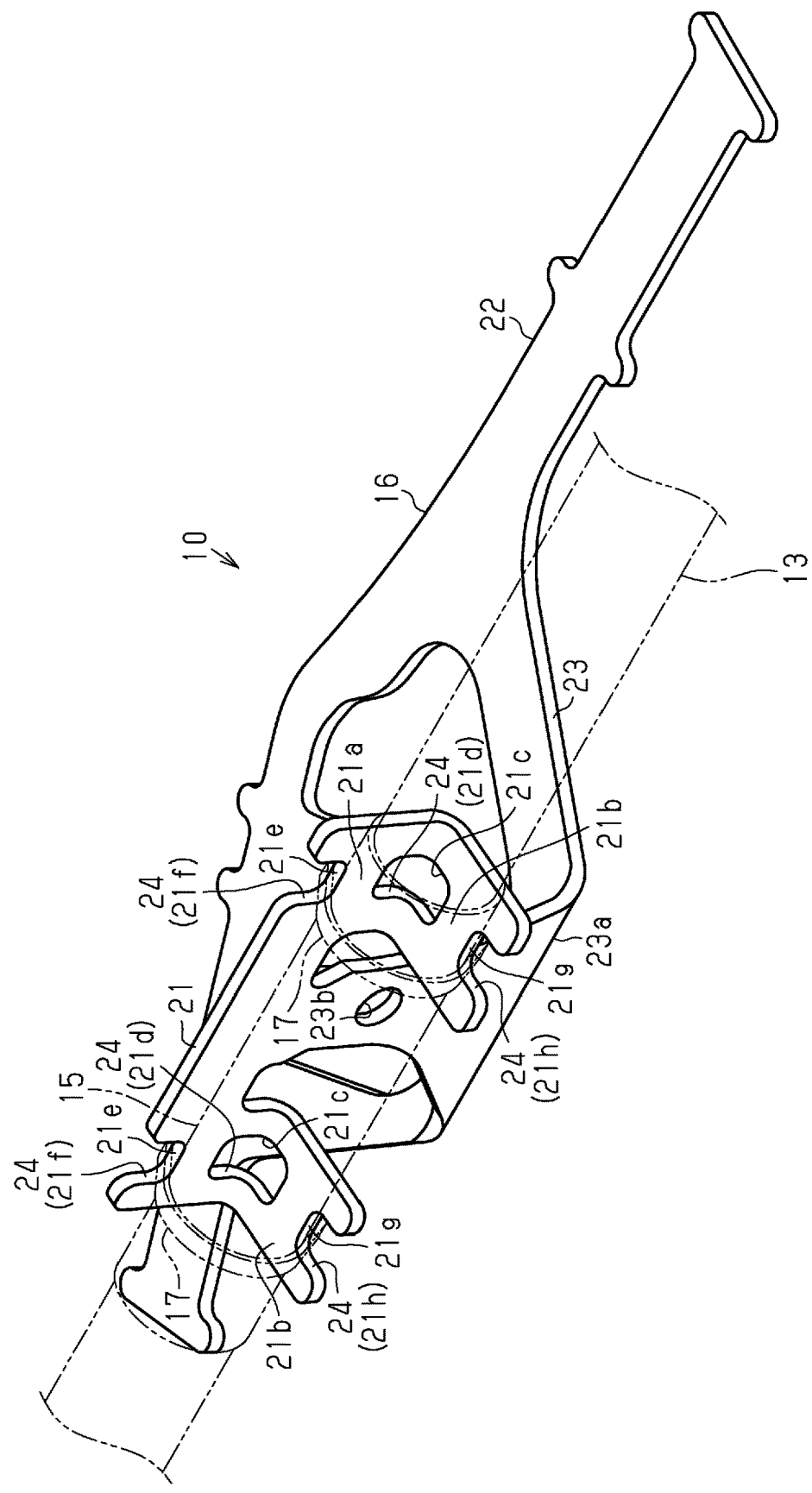
FIG. 3 is a perspective view partially illustrating the wire harness unit of the embodiment.
Figure 4:
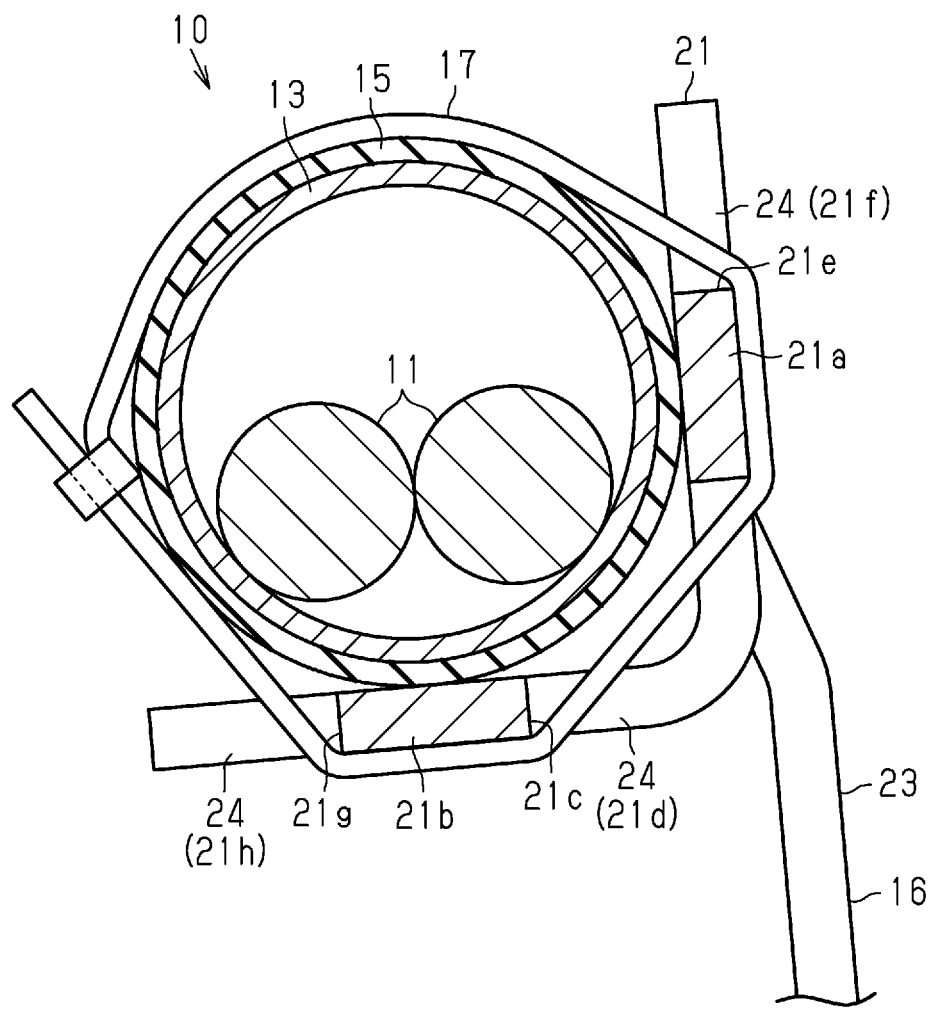
FIG. 4 is a cross-sectional view partially illustrating the wire harness unit of the embodiment.

As shown in FIGS. 3 and 4, the first fixing portion 21 supports the metal pipe 13 with the rubber member 15 in between. The first fixing portion 21 includes a first section 21a and second sections 21b, which extend in a bent state from the first section 21a. Specifically, the first section 21a is continuous with a first end of the coupling portion 23 and extends toward the front and the rear of the vehicle V (refer to FIG. 1) from the coupling portion 23. The second sections 21b are provided at the opposite ends in the longitudinal direction of the first section 21a. The second sections 21b extend in a bent state from the first section 21a so as to support, in collaboration with the first section 21a, the metal pipe 13 at two positions in the circumferential direction on the outer circumferential surface.

The fastening bands 17 surround and fasten the rubber member 15 and the first fixing portion 21. That is, the metal pipe 13 is supported by the first fixing portion 21 with the rubber member 15 in between. To maintain this state, the fastening bands 17 are wrapped around the rubber member 15 and the first fixing portion 21. The fastening bands 17 are provided at two positions that correspond to the positions of the second sections 21b.

The first fixing portion 21 includes engagement portions 24 in parts in the longitudinal direction of the metal pipe 13. The engagement portions 24 are engageable with the fastening bands 17. Specifically, the first fixing portion 21 includes through-holes 21c, each of which extends across the first section 21a and the corresponding second sections 21b. Each engagement portion 24 includes an inner wall surface 21d of the associated through-hole 21c. The first section 21a includes first recesses 21e, which are provided at an end opposite to the second sections 21b. Each engagement portion 24 includes an inner wall surface 21f of the associated first recess 21e. Each second section 21b includes a second recess 21g, which is provided at an end opposite to the first section 21a. Each engagement portion 24 includes an inner wall surface 21h of the associated second recess 21g. That is, while surrounding and fastening the rubber member 15 and the first fixing portion 21, the fastening bands 17 are located within the through-holes 21c, the first recesses 21e, and the second recess 21g, so as to be engaged with the inner wall surfaces 21d, 21f, and 21h of the through-holes 21c, the first recesses 21e, and the second recess 21g.

As shown in FIG. 2, the second fixing portion 22 supports the corrugated tube 14. The second fixing portion 22 is formed continuously with a second end of the coupling portion 23 and extends toward the front and the rear of the vehicle V (refer to FIG. 1) from the coupling portion 23. Specifically, the coupling portion 23 includes a bent portion 23a in the middle section. The section of the coupling portion 23 between the bent portion 23a and the second end is bifurcated. Specifically, the second fixing portion 22 couples the bifurcated parts at the second end of the coupling portion 23 to each other, and extends from the coupling portion 23 toward the front and the rear of the vehicle V (refer to FIG. 1).

The adhesive tapes 18 are wrapped around and support the corrugated tube 14 and the second fixing portion 22. That is, the corrugated tube 14 is supported along the second fixing portion 22. To maintain this state, the adhesive tapes 18 are wrapped around the corrugated tube 14 and the second fixing portion 22. The adhesive tapes 18 are provided at four positions in the longitudinal direction of the second fixing portion 22.

The coupling portion 23 of the bracket 16 has a fixing hole 23b at a position relatively close to the first end. The bracket 16 is fixed to the vehicle V by a bolt (not shown) that is passed through the fixing hole 23b and threaded into a fixing portion in the floor panel of the vehicle V.

An operation of the wire harness unit 10, which is configured as described above, will now be described.

The metal pipe 13 and the bracket 16 of the wire harness unit 10 are located underneath the floor panel of the vehicle V, and therefore may be splashed with water, for example, when it is raining. The metal pipe 13 and the bracket 16 are made of different metals. Thus, if the metal pipe 13 and the bracket 16 were in direct contact with each other, galvanic corrosion would occur. However, since the rubber member 15 is disposed between the metal pipe 13 and the bracket 16, galvanic corrosion does not occur.

The above-described embodiment has the following advantages.

(1) The metal pipe 13 is made of a metal that contains aluminum, which is a first metal, as the major component. The bracket 16 is made of a metal that contains a second metal, which is different from the first metal, as the major component. The second metal is iron in the present embodiment. Therefore, although direct contact between the metal pipe 13 and the bracket 16 would likely cause corrosion, the above-described embodiment, in which the rubber member 15 prevents direct contact between the metal pipe 13 and the bracket 16, prevents corrosion from occurring. Also, the fastening bands 17, which surround and fasten the rubber member 15 and the first fixing portion 21, bite into the rubber member 15, prevent the metal pipe 13 from being displaced in the longitudinal direction in relation to the first fixing portion 21.

(2) The first fixing portion 21 includes the engagement portions 24, which are engageable with the fastening bands 17 in the longitudinal direction of the metal pipe 13. This prevents the fastening bands 17 from being displaced in relation to the first fixing portion 21.

(3) The first fixing portion 21 includes the first section 21a, the second sections 21b, which extend in a bent state from the first section 21a, and the through-holes 21c, each of which extends across the first section 21a and the corresponding second section 21b. Each engagement portion 24 includes an inner wall surface 21d of the associated through-hole 21c. The fastening bands 17 are thus engaged with the inner wall surfaces 21d of the through-holes 21c. This prevents the fastening bands 17 from being displaced in relation to the first fixing portion 21.

(4) The first section 21a includes the first recesses 21e, which are provided at the end opposite to the second sections 21b. Each engagement portion 24 includes an inner wall surface 21f of the associated first recess 21e. The fastening bands 17 are thus engaged with the inner wall surfaces 21f of the first recesses 21e. This prevents the fastening bands 17 from being displaced in relation to the first fixing portion 21.

(5) Each second section 21b includes a second recess 21g, which is provided at the end opposite to the first section 21a. Each engagement portion 24 includes the inner wall surface 21h of the associated second recess 21g. The fastening bands 17 are thus engaged with the inner wall surfaces 21h of the second recess 21g. This prevents the fastening bands 17 from being displaced in relation to the first fixing portion 21.

(6) The bracket 16 includes the second fixing portion 22, which supports the corrugated tube 14, and the coupling portion 23, which couples the first fixing portion 21 and the second fixing portion 22 to each other. This allows the single bracket 16 to support both the metal pipe 13 and the corrugated tube 14. Accordingly, the metal pipe 13 and the corrugated tube 14 can be collectively fixed to the vehicle V using the bracket 16.

(7) The coupling portion 23 includes the bent portion 23a. Thus, the metal pipe 13 and the corrugated tube 14 can be fixed in an arrangement space having a complicated shape.

The above-described embodiments may be modified as follows. The above-described embodiment and the following modifications can be combined as long as the combined modifications remain technically consistent with each other.

In the above-described embodiment, the first fixing portion 21 includes the engagement portions 24, which are engageable with the fastening bands 17. The engagement portions 24 are located at parts that are separated in the longitudinal direction of the metal pipe 13. However, the engagement portions 24 may be omitted. If the engagement portions 24 are omitted, the fastening bands 17, which are fastening members, may be replaced by adhesive tapes, so that displacement is prevented by the adhesion of the adhesive tapes.

In the above-described embodiment, the engagement portions 24 include the inner wall surfaces 21*d*, 21*f*, and 21*h* of the through-holes 21*c*, the first recesses 21*e*, and the second recess 21*g*. However, the engagement portions 24 may include one of the inner wall surfaces 21*d*, 21*f*, and 21*h*. Structures other than inner wall surfaces may be employed as engagement portions.

In the above-described embodiment, the bracket 16 includes the second fixing portion 22, which supports the corrugated tube 14. However, the present disclosure is not limited to this. For example, a structure may be employed that does not support a second tubular member (such as the corrugated tube 14).

In the above-described embodiment, the coupling portion 23 of the bracket 16 includes the bent portion 23*a*. However, the present disclosure is not limited to this. For example, a structure may be employed that does not include the bent portion 23*a*.

In the above-described embodiment, the metal pipe 13 is made of a metal that contains aluminum, which is a first metal, as the major component. However, the metal pipe 13 may be made of other types of metal. The bracket 16 is made of a metal that contains iron as the major component. However, the bracket 16 may be made of other types of metal as long as that metal contains a second metal, which is different from the first metal, as the major component.

In the above-described embodiment, the rubber member 15 is made of ethylene propylene diene (EPDM) rubber. However, the rubber member 15 may be made of other types of rubber material.

In the above-described embodiment, the rubber member 15 is molded into a sheet and wrapped around the outer circumferential surface of the metal pipe 13. However, the present disclosure is not limited to this. For example, the rubber member 15 may be molded into a tube and fitted around the outer circumferential surface of the metal pipe 13.

In the above-described embodiment, the first fixing portion 21 includes the first section 21*a* and the second sections 21*b*, which extend in a bent state from the first section 21*a*. However, the present disclosure is not limited to this. The first fixing portion 21 may be formed to have other shapes. For example, the first fixing portion does not necessarily need to include the second sections 21*b*. For example, the first fixing portion may have a curved shape extending along the outer circumferential surface of the rubber member 15.

The first section 21*a* and the second sections 21*b* of the above-described embodiment are configured to support two positions in the circumferential direction of the outer circumferential surface of the metal pipe 13. However, the first section 21*a* and the second sections 21*b* may be configured to support three or more positions in the circumferential direction of the outer circumferential surface of the metal pipe 13. For example, the first section 21*a* may be bent so as to contact two or more positions in the circumferential direction of the outer circumferential surface of the metal pipe 13. Further, the second sections 21*b* may each be bent so as to contact two or more positions in the circumferential direction of the outer circumferential surface of the metal pipe 13.

In the above-described embodiment, the first fixing portion 21 includes two second sections 21*b*. However, the present disclosure is not limited to this. The first fixing portion 21 may include only one second section 21*b*, or three or more second sections 21*b*.

The corrugated tube 14 of the above-described embodiment, which is the second tubular member, may be replaced by other types of pipe, such as a plastic pipe of a constant diameter or a metal pipe.

The first section 21*a* and the second sections 21*b* may be configured to hold the metal pipe 13 between each other.

As shown in FIG. 3, the first recesses 21*e* may be formed in a side of the first section 21*a* that extends in the axial direction of the metal pipe 13. The second recesses 21*g* may each be formed in a side of a second section 21*b* that extends in the axial direction of the metal pipe 13.

The through-holes 21*c*, the first recesses 21*e*, and the second recesses 21*g* may be arranged in the circumferential direction of the metal pipe 13.

As shown in FIG. 2, the second fixing portion 22 may include protrusions for preventing displacement of the adhesive tapes 18.

The present disclosure includes the following implementations. Reference numerals are added to some elements of the illustrated embodiment to facilitate understanding but not to limit the scope of the invention.

[Implementation 1] A wire harness unit (10) according to one aspect of the present disclosure may include:

a first electrical cable (11);

an elongated first metal tube (13) that covers the first electrical cable (11);

a rubber sheet (15) that is in frictional contact with an outer circumferential surface of the first metal tube (13) within a selected length of the first metal tube (13);

a metal bracket (16) that includes a first fixing portion (21), the first fixing portion (21) supporting the first metal tube (13) with the rubber sheet (15) in between; and a fastening band (17) that surrounds and collectively fastens the rubber sheet (15) and the first fixing portion (21), and is in frictional contact with the rubber sheet (15), wherein the rubber sheet (15) may be wrapped around the selected length of the first metal tube (13) such that the first metal tube (13) and the metal bracket (16) are in non-contact state and electrically insulated from each other.

[Implementation 2] In one or more aspects of the present disclosure, the first metal tube (13) may be made of a first metal containing a first metallic element as the major component of the first metal, and the bracket (16) may be made of a second metal containing a second metallic element as the major component of the second metal.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A wire harness unit, comprising:
a first electrical cable;
a first tubular member that covers the first electrical cable;
a rubber member that is attached to an outer circumferential surface of the first tubular member;
a bracket that includes a first fixing portion, the first fixing portion supporting the first tubular member with the rubber member in between; and
a fastening member that surrounds and fastens the rubber member and the first fixing portion, wherein
the first tubular member is made of a metal that contains a first metal as a major component, and
the bracket is made of a metal that contains a second metal, which is different from the first metal, as a major component.

2. The wire harness unit according to claim 1, wherein the first fixing portion includes an engagement portion located at a part, in a longitudinal direction, of the first tubular member, the engagement portion being engageable with the fastening member.

3. The wire harness unit according to claim 2, wherein
the first fixing portion includes a first section, a second section that extends in a bent state from the first section, and a through-hole that extends across the first section and the second section, and
the engagement portion includes an inner wall surface of the through-hole.

4. The wire harness unit according to claim 2, wherein
the first fixing portion includes a first section and a second section that extends in a bent state from the first section,
the first section includes a first recess that is provided at an end on a side opposite to the second section, and
the engagement portion includes an inner wall surface of the first recess.

5. The wire harness unit according to claim 4, wherein
the second section includes a second recess that is provided at an end on a side opposite to the first section, and
the engagement portion includes an inner wall surface of the second recess.

6. The wire harness unit according to claim 1, further comprising:
a second electrical cable; and
a second tubular member that covers the second electrical cable, wherein the bracket includes:
a second fixing portion that supports the second tubular member; and
a coupling portion that couples the first fixing portion and the second fixing portion to each other.

7. The wire harness unit according to claim 6, wherein the connecting portion includes a bent portion.

* * * * *